United States Patent [19]

Taylor

[11] 4,455,029

[45] Jun. 19, 1984

[54] WHEEL CHAIRS

[76] Inventor: George Taylor, 2 Morton Carr Cottages, Nunthorpe, Middlesbrough, Cleveland T57 OPE, England

[21] Appl. No.: 360,475

[22] Filed: Mar. 22, 1982

[30] Foreign Application Priority Data

Apr. 3, 1981 [GB] United Kingdom ................. 8110557

[51] Int. Cl.[3] ................................................ B62B 5/02

[52] U.S. Cl. .................................... 280/5.28; 180/8.2; 280/5.3; 280/242 WC; 280/DIG. 10

[58] Field of Search ...................... 280/5.2, 5.22, 5.28, 280/5.3, 5.32, 242 WC, DIG. 10; 180/8.2, DIG. 3

[56] References Cited

U.S. PATENT DOCUMENTS

Re. 28,256 11/1974 Zamotin ............................ 280/5.22

3,869,146 3/1975 Bulmer ........................ 280/242 WC 3,905,437 9/1975 Kaiho et al. ......................... 280/5.3

*Primary Examiner*—Joseph F. Peters, Jr.

*Assistant Examiner*—Kenneth R. Rice

*Attorney, Agent, or Firm*—Ross, Ross & Flavin

[57] ABSTRACT

A wheel chair has means for surmounting obstacles, comprising extensible legs 8 with wheels 10 at their feet ends, a link cable or the like mechanical connection actuable by a handle, 18 for lifting the wheelchair, the legs being extensible by pushing the handle forward to force the wheels 10 downwardly and lift the castors 5, and auxiliary rear wheels 31 being lowered for lifting the main wheels 6. Each lever 17 is mechanically connected to bell crank 28 pivoted on the rear of a base frame member. The bell crank carries, with a similar crank on the other side, the auxiliary rear wheels 31 which can be raised and lowered in response to lever 17. The wheels 31 are driven via a belt drive 33 running about the periphery of the wheels 31 and driven from the main wheels of the wheel chair by a pulley 34. A sprocket and chain drive can be used instead.

6 Claims, 2 Drawing Figures

WHEEL CHAIRS

This invention relates to improvements in wheel chairs.

Known wheel chairs which are designed to be propelled by the occupant without assistance generally consist of a frame incorporating a seat and foot rests and have two large diameter wheels towards the rear and two smaller castor mounted wheels at the front. The rear wheels are fitted with an auxiliary rim smaller in diameter than the rear wheels which is used by the occupant to turn the rear wheels by hand action and thus propel the invalid chair forwards or backwards. There is however no provision to allow the wheel chair to surmount or dismount obstacles such as steps, or roadside curbs.

It is an object of the invention to provide a wheel chair with means enabling the wheel chair to mount and dismount vertical obstacles such as steps and curbs.

According to the invention, a wheel chair carries fore and or aft outwardly extending and/or extensible leg means capable of engagement with the upper surface of an obstacle and adapted for raising and lowering with lifting of the front of the chair whereby the front wheel may engage an upper surface of the obstacle.

Two legs may be connected by linkages one at each side of the chair and having a manually pivotable lever.

The lever may also actuate a linkage operative on auxiliary rear wheel means drivable from the main wheels of the wheel chair to raise and lower the auxiliary rear wheel means: joint linkages provide that as the leg means are extended to lift the front of the chair auxiliary rear wheels are lowered thereby lifting the main wheel to the height required.

The leg means and auxiliary rear wheel means enable a wheel chair to surmount common obstacles such as a 4" (10 cm) curb or single or widely spaced flights of steps of comparable height. The auxiliary rear wheels and the leg means when lowered from an extension to the wheel base to front and rear which provides stability and prevents overturning.

Figure 1:
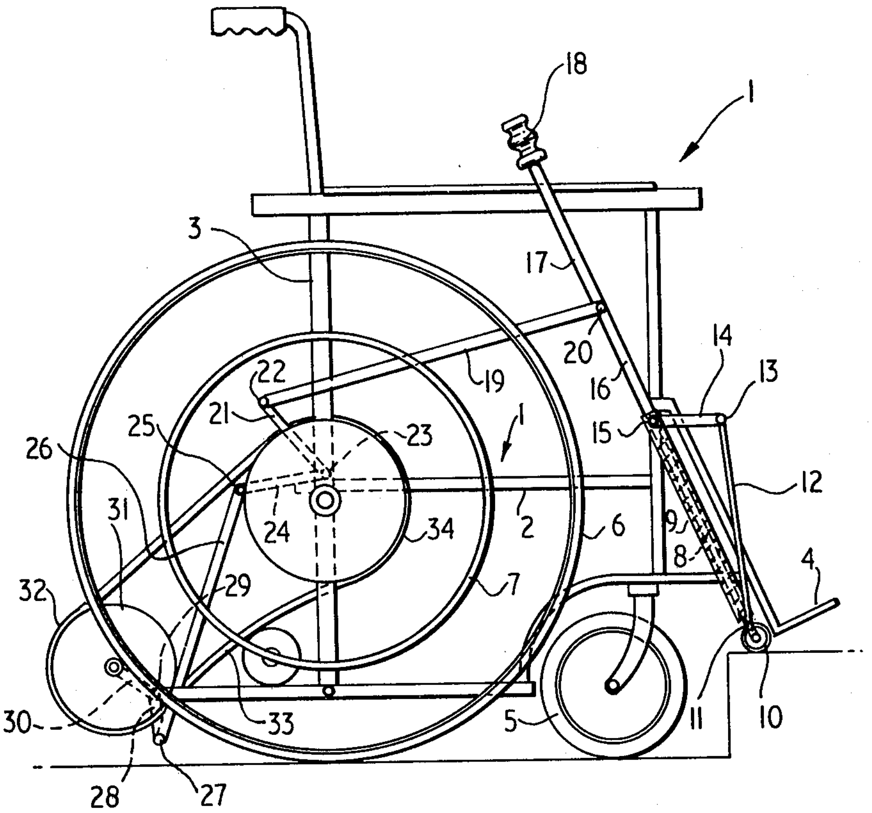
Figure 2:
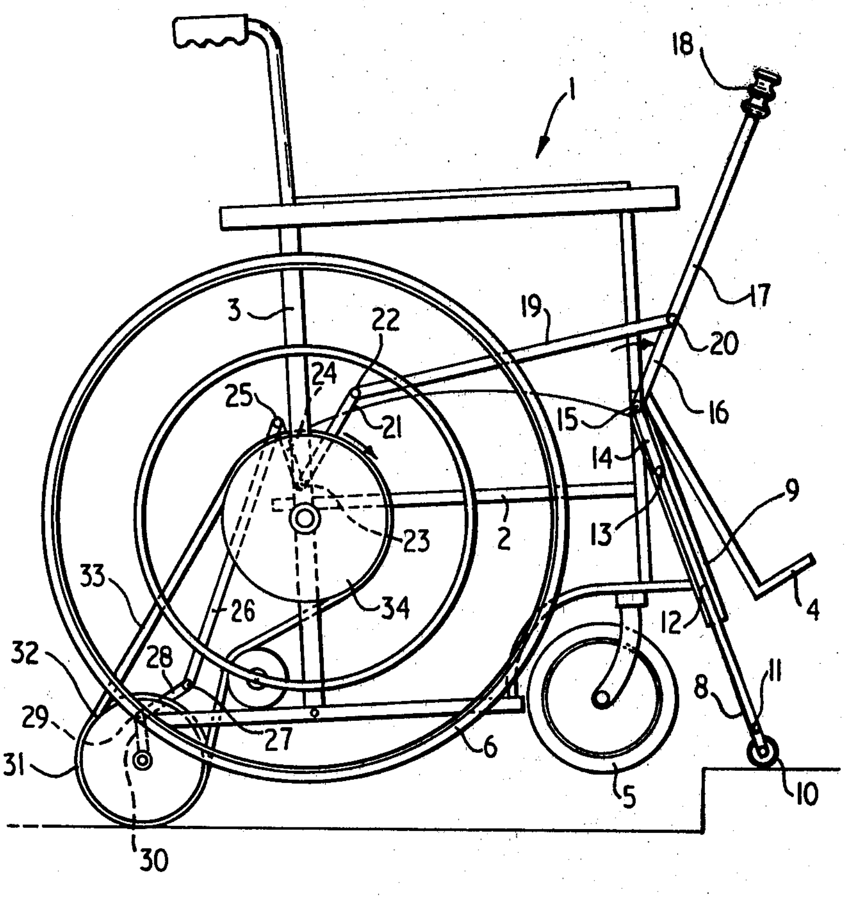

A preferred embodiment of the wheel chair according to the invention will now be described by way of example with reference to the accompanying drawings wherein:

FIG. 1 is a diagrammatic side view showing the wheel chair about to surmount an obstacle; and FIG. 2 is a corresponding view showing the chair raised to surmount the obstacle.

As shown diagrammatically in the drawings, a wheel chair 1 comprises a frame supporting a seat 2, a backrest 3 and foot rest 4. The frame carries a pair of front castor mounted wheels 5, and main wheels 6 of large diameter powered manually by pushing on an auxiliary rim 7.

At the front of the chair 1, at each side a telescopic leg 8 is provided slidable in a guide tube 9. The lower end of each leg 8 carries a roller or small wheel 10, and is connected at pivot 11 to a lever 12, pivoted at an elbow 13 to a further lever arm 14 forming one part of a bell-crank pivoted at 15 at the upper end of the telescopic leg 8. The bell crank has a second arm 16 angularly fixed in relation to arm 14 and forms a continuous member with a lever 17 having a hand grip 18 at its upper end. A further link 19 is pivoted to lever 17/arm 16 at 20 and connects with a first arm 21 of a second bell crank at a pivot 22. The bell crank is pivoted at 23 and has a second arm 24 angularly fixed with respect to first arm 21 and connected at pivot 25 to a link 26.

Link 26 is in turn connected at pivot 27 to a first arm 28 of a third bell crank which is pivoted at 29 on the chassis or base frame of the wheel chair and has a second arm 30 angularly fixed with respect to arm 28 carrying a liftable and lowerable wheel 31.

Wheel 31 has a sprocket or pulley 32 drivable via a chain or belt 33 from a second sprocket or pulley 34 coaxial with and rotationally fixed to the main wheel 6.

In mounting an obstruction such as a step, or curb of normal height, the chair is pushed up to the obstacle, so that wheels 10 are over the obstacle. The chair user then pushes forward the lever 17. This causes the linkage comprised by bell crank arm 14 and lever 12 to straighten thereby causing the telescopic leg 8 to be extended. This in turn causes the front end of the chair to be lifted. At the same time, pushing forward of lever 17 about pivot 15 causes link 19 to be pulled forward, thereby rotating bell crank 21, 24 on pivot 23 and pulling link 26 which in turn rotates the third bell crank 28, 30 on pivot 29 causing wheel 31 to be lowered into the position shown in FIG. 2. The wheel chair is now as illustrated in FIG. 2 and can be moved by pushing on the auxiliary rims 7, torque being transmitted via sprocket or pulley 34, chain or belt 33 and sprocket or pulley 32 to wheel 31. When this has been done, and the main wheels 6 are on the step, the lever 17 can be pulled back, thereby retracting the telescopic legs and raising the wheels 31.

To descend a step, the reverse procedure is applied ie the lever 17 is pushed forward so that the telescopic leg 8 will reach down to the lower level, the chair is then propelled forwardly until the wheels 31 descend the step. The lever 17 is then pulled back retracting the legs 8 and wheels 31, lowering the chair to the lower level so that the wheels 5 and 7 contact the ground.

The sprocket or pulley 32 is of larger diameter than the sprocket or pulley 34, so that a reduction in rotational speed is achieved although the peripheral velocity of the sprockets remains the same, as in conventional gearing.

This enables the wheel chair to be maneuvered carefully. This reduction effect can also be used with advantage in climbing a ramp since speed reduction gives rise to a reciprocal increase in tractive effort. The wheels may be provided by pulleys, with a belt forming a tire.

The legs and or auxiliary wheels may be extended and retracted by conventional means, for instance a piston and cylinder arrangement or worm gear alternatively or, more especially in the case of the legs additionally to manual leverage.

Springs may be provided which act to reinforce the action of the lever linkages in extending the leg 8 and lowering the auxiliary wheel. The lever system described is provided at each side of the wheel chair which may be constructed to be foldable, without interference by the levers.

Such a device is useful for enabling a wheel chair to mount pavement curbs or single steps or even flights of widely spaced steps where there is room for the length of the wheel chair to be accommodated between steps. By enabling a wheel chair to be thus maneuvered by its occupant, the independence of disabled wheel chair users is substantially increased so that they do not have to seek the assistance of friends, companions or members of the general public as frequently as heretofore to negotiate obstacles.

What I claim is:

1. A wheel chair having main wheels of relatively large diameter and front wheels of relatively small diameter and further having forwardly extensible leg means and auxiliary rear wheel means, both said leg means and said rear wheel means being linked to an operating handle such that movement of said handle extends said leg means to lift the front of the chair to enable said front wheels to engage an upper surface of an obstacle and that movement of said handle also lowers the auxiliary rear wheel means, whereby the main wheels are lifted to the height of said upper surface of an obstacle, said auxiliary rear wheel means being drivable from said main wheels so as to advance the chair when said rear wheel means is lowered.

2. A wheel chair according to claim 1, wherein the leg means comprises two telescopic legs, one at each side of the chair and extensible by means of a lever carrying said operating handle.

3. A wheel chair according to claim 2, wherein the telescopic legs each carries at its lower end a roller or wheel.

4. A wheel chair according to claim 2 or 3, wherein the auxiliary rear wheel means comprises a pair of auxiliary wheels mounted on one arm of a pivoted bell crank, the other arm of the bell crank being connected to said lever, whereby said auxiliary wheels are raised or lowered on movement of said lever.

5. A wheel chair according to claim 4, wherein the auxiliary wheels are driven from the main wheels by means of a belt or chain transmission.

6. A wheel chair according to claim 5, wherein the transmission is a belt transmission and a belt passes over a pulley and each of the auxiliary wheels so that there is a reduction effect in the transmission.

* * * * *